United States Patent [19]

Tabu et al.

[11] Patent Number: 5,299,187
[45] Date of Patent: Mar. 29, 1994

[54] TIME-MULTIPLEXED HIGHWAY LINE DESIGNATING SYSTEM

[75] Inventors: Takashi Tabu; Kenichi Okabe; Masaki Kira, all of Kawasaki, Japan

[73] Assignee: Fujitsu Limited, Kanagawa, Japan

[21] Appl. No.: 948,044

[22] Filed: Sep. 21, 1992

[30] Foreign Application Priority Data

Sep. 19, 1991 [JP] Japan .................................. 3-239643

[51] Int. Cl.⁵ .............................................. H04Q 11/00
[52] U.S. Cl. .................................... 370/56; 370/105.2; 370/112
[58] Field of Search ................... 370/112, 56, 58.1, 66, 370/68, 77, 85.1, 100.1, 105.2; 379/333, 334; 328/104

[56] References Cited

U.S. PATENT DOCUMENTS

| | | | |
|---|---|---|---|
| 4,571,721 | 2/1986 | Yasui et al. | 370/56 |
| 4,689,784 | 8/1987 | Whitesel | 370/112 |
| 4,891,808 | 1/1990 | Williams | 370/112 |
| 5,029,160 | 7/1991 | Homma | 370/112 |

Primary Examiner—Douglas W. Olms
Assistant Examiner—Hassan Kizou
Attorney, Agent, or Firm—Nikaido, Marmelstein, Murray & Oram

[57] ABSTRACT

A time-multiplexed highway line designating system used in a time divisional electronic switching unit comprises line interface units each being provided corresponding to each line, a storing unit provided in the interface unit for storing time slot information specific to each line processed in a time divisional manner, and a timing generating circuit provided in the interface unit for generating from the time slot information a timing for the line.

12 Claims, 16 Drawing Sheets

| B1 DATA | 1 | 9 | 17 | 25 | 2 | 10 | 18 | 26 | 3 | 11 | 19 | 27 | 4 | 12 | 20 | 28 |
|---|---|---|---|---|---|---|---|---|---|---|---|---|---|---|---|---|
| B2 DATA | 32 | 1 | 9 | 17 | 25 | 2 | 10 | 18 | 26 | 3 | 11 | 19 | 27 | 4 | 12 | 20 | 28 |
| D DATA | 24 | 32 | 1 | 9 | 17 | 25 | 2 | 10 | 18 | 26 | 3 | 11 | 19 | 27 | 4 | 12 | 20 |
| CONTROL (C) | 16 | 24 | 32 | 1 | 9 | 17 | 25 | 2 | 10 | 18 | 26 | 3 | 11 | 19 | 27 | 4 | 12 |

Fig. 7
PRIOR ART

TIME-MULTIPLEXED HIGHWAY LINE DESIGNATING SYSTEM

FIELD OF THE INVENTION

The present invention relates to a time divisional electronic switching system, and more specifically to a time multiplexed-highway line designating system for controlling a line interface unit.

BACKGROUND OF THE INVENTION

A time divisional electronic switching unit transmits voices and data to line interface units after time-multiplexing them. The time divisional method can utilize more efficiently in space than the conventional method in which physical wires and patterns printed on printed wiring boards are provided one to one to each line interface unit in a space divisional manner. However, since signals of a plural number of line interface units correspond to a physical signal line in the above described time-multiplexing method, a strobe signal is required to communicate where in the timing in the time-multiplexed highway the necessary data are located and the timing that the data to be transmitted should be positioned so that information is correctly transmitted to and collected from a desired line interface unit.

For example, when voice data and digital data are transmitted at the rate of 256 Kb/s per line, and the number of lines to be controlled is 128, 128 lines of 256 Kb/s data lines are required when a time-multiplexing system is not employed. However, only sixteen data lines for transmitting data at the rate of 2.048 Mb/s are required because eight lines can be time multiplexed. Furthermore, fewer signal lines are required if the data lines are more efficiently used.

Thus, since the information for eight lines for example, is multiplexed into one signal line, a signal is required to notify each of the line interface units of the timing of the data transmitted to each line. In a circuit pack containing a common circuit for 8 lines, one signal line is provided for each highway. This is normally referred to as a frame synchronous signal (FCK). In response to this signal, each necessary timing is generated by an internal counter of a control circuit commonly provided for eight lines in synchronization with the system common unit, and data is obtained by and output from each line. Since a number of signal lines (at least eight lines) indicating various timings are required in between the common circuit for lines and the line interface units, this is applicable to the system in which each of the lines to be multiplexed to a highways is housed in one circuit pack.

FIG. 1 shows the configuration of the conventional switching unit accommodating 16 highways. A system common unit CMC outputs highways H1–H16, a frame synchronous signal FCK, and a clock signal CLOCK. Similary, the system common unit receives 16 highways from the line circuit pack. Circuit packs PCB1–PCB16 are provided corresponding to highways H1–H16. For example, highway H1 is associated with circuit pack PCB1. Circuit pack PCB1 comprises a common unit for lines comprising a controller CTRX and a timing generator TGX, and line interface circuits L1–L8 each of which connect to a telephone line and a common highway H1. The common unit for lines generates a clock by which corresponding data are received from the highway to line interface units L1–L8, and vise versa data is output to the highway. Using the clock, the line interface units multiplex data into the highway.

FIG. 2 is a timing chart of the conventional method. In single-phase highways in which all the highways are synchronized in one phase, an 8-phase synchronous signal is required for highways H1–H16. That is, in response to a frame synchronous signal FCK, 8-synchronous signals are necessary for multiplexing. Therefore, if a single-line circuit pack is realized, an independent clock must be generated for each of the lines C1–CB.

FIG. 3 shows the circuit of a controller CTRX, and FIG. 4 shows the circuit of a timing generator TGX. The counter of the controller CTRX comprises a counter preset by a frame synchronous signal and started by a clock signal CLOCK. Its count outputs BCA–BCC and TSCA–TSCR are applied to a timing generator, decoded by a decoder comprising OR gates OR1–OR3, and received by a flipflop in synchronizing with the clock signal CLOCK when a specific value "0" is indicated. Since eight decoders are provided, inverters IX1–IX3 are inserted after determining according to each of the decoding values as to whether or not the outputs of the counter TSCC, TSCD, and SSCE, to be applied to each decoder to obtain an 8-phase clock, should be inverted. The 8-phase clock can be thus generated. FIG. 4 shows that the timing signal is output when all of TSCC, TSCD, and TSCE indicate "1". The absence or presence of the inverter generates an 8-phase clock through eight circuits.

When the system comprises a single-line circuit pack, the selection of a line is not determined at the manufacturing of the circuit pack. Therefore, to apply to operation of the single-line circuit pack, a circuit for generating eight types of phases must be incorporated for all channels. Otherwise, each line interface unit must be provided with a controller and a timing generator for one line as shown in FIG. 5, which are similar to those in the above described common unit for lines.

If the 16 highways have the same phase, 8 synchronous signals must be provided per 128 lines. However, if the 256 kb/s of a signal to a line coordinating unit comprises four 64 Kb/s parts, more synchronous signal lines are required. Four 64 Kb/s parts are, for example, B1, B2, and D for the ISDN, in addition to a control signal.

In this case, 32 (8×4) synchronous signals are required for 128 lines.

FIG. 6 is a timing chart of a 4-phase highway. 4 time slots are assigned to one line, and H1–H4 are shifted in phase. Each of the 4 phases has a different phase configuration depending on the data in B1, B2, D, and C (control data).

If the four 64 Kb/s parts corresponds to B1, B2, and D for the ISDN, and a control signal, four phases are normally supplied for convenience in designing the system common unit. In this case, 32 (4×8) synchronous signals per 128 lines are required.

FIG. 7 shows a timing chart when data is transmitted on one highway divided into four phases. FIG. 7 shows that, with respect to data B1, B2, C and D shown in FIG. 6, data at which synchronous timing (1–32) is transmitted.

The system provided with a common unit for lines and the line interface circuits mounted on a single circuit pack often causes a problem in maintenance. That is, since the system comprises more than one line in a circuit pack, one defective line affects the other lines, for example, by requiring the replacement of all lines simultaneously and during the replacement other circuits can not be used. Therefore, lately, a method of implementing one line in one circuit pack (a single-line circuit pack method) has become more popular than the above described method of implementing a plurality of lines in one circuit pack.

In the single-line circuit pack method, however, the conventional technique cannot be applied when it is desired to have the minimum number of signal lines incorporated through a simple connection. This is the case for example, when each of the line interface circuits L1-L8, which are independent from one another, must be provided with controllers CTRY and timing generators TGY corresponding to the common unit for lines as shown in FIG. 5.

Thus, providing a circuit pack corresponding to a single line results in effective maintenance. However, in spite of the reduction of the number of signals by time multiplexed highway technique, the number of control signal lines and clock signal lines increases and the wiring in the whole system becomes complicated.

SUMMARY OF THE INVENTION

The present invention aims at a time-multiplexed highway line designating system for controlling the designation of lines in the line interface units in the time-multiplexed highways. It aims at realizing a time-multiplexed highway line designating system for reducing the necessary number of lines and improving the maintainability.

In a time divisional electronic switching unit in which a signal is transmitted to a plurality of lines through a time-multiplexed highway, a line interface unit provided for each line comprises a storage unit for storing line-specific time slot information in a time divisional process, and a timing generating circuit for generating timing of a line according to the time slot information.

The feature of the present invention resides in a time-multiplexed highway line designating system used in a time divisional electronic switching unit. The system comprises line interface units provided for each line, a storing unit provided in the interface units for storing time slot information specific to each line that is processed in a time divisional manner, and a timing generating circuit unit provided in the interface units for generating the timing for the line from the time slot information.

BRIEF EXPLANATION OF THE DRAWINGS

One skilled in reading drawings can easily understand additional features and objects of this invention from the description of the preferred embodiments and some of the attached drawings. In the drawings:

FIG. 7 is another timing chart of the 4-phase

DESCRIPTION OF THE PREFERRED EMBODIMENT

The present invention is explained below in detail by referring to the attached drawings.

Figure 1:
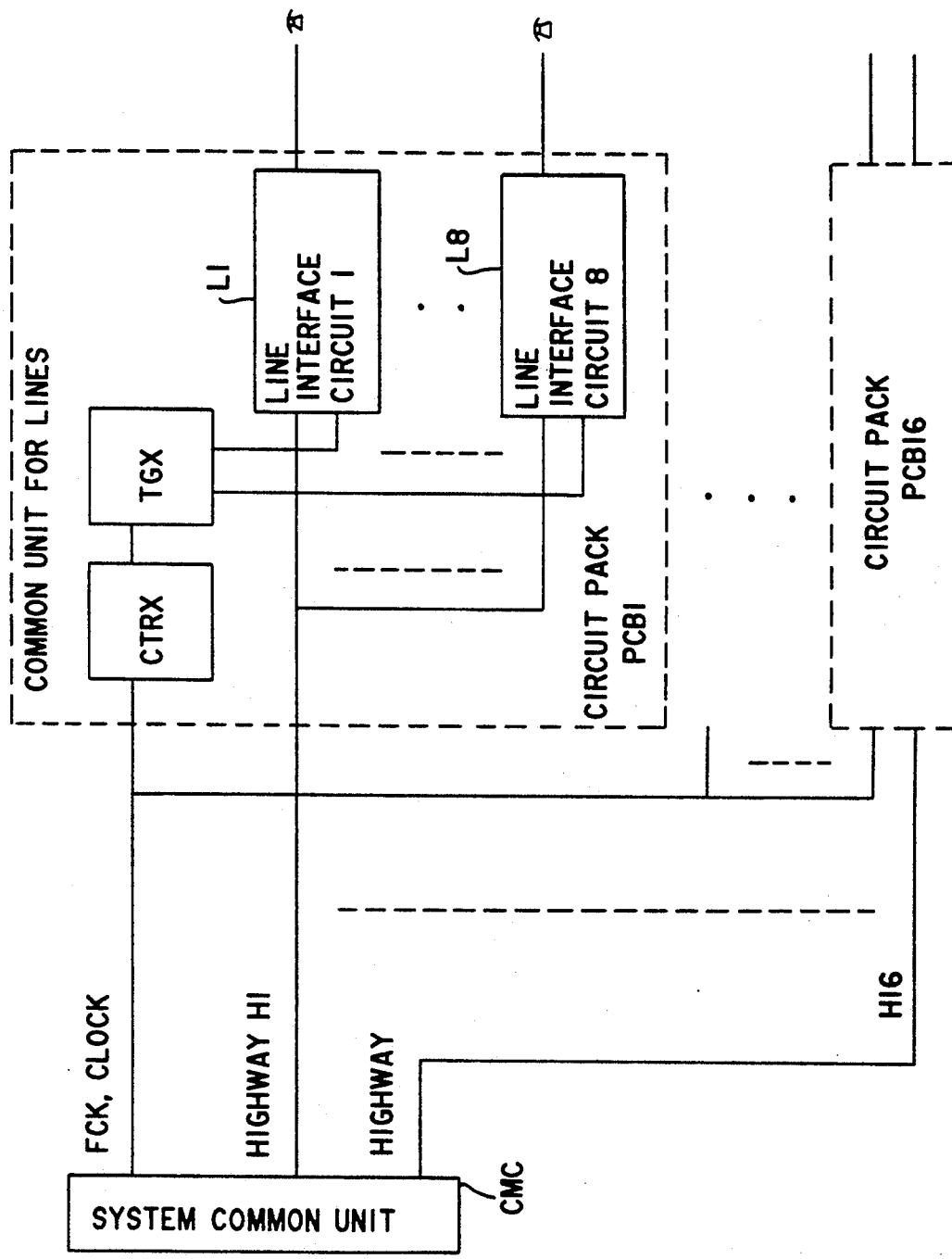
FIG. 1 shows the configuration of the conventional method.
Figure 2:
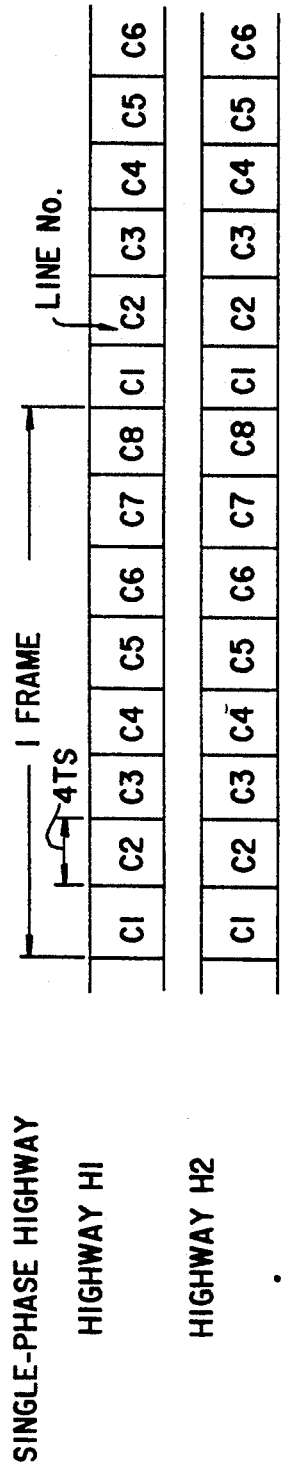
FIG. 2 is a timing chart of the conventional method.
Figure 3:
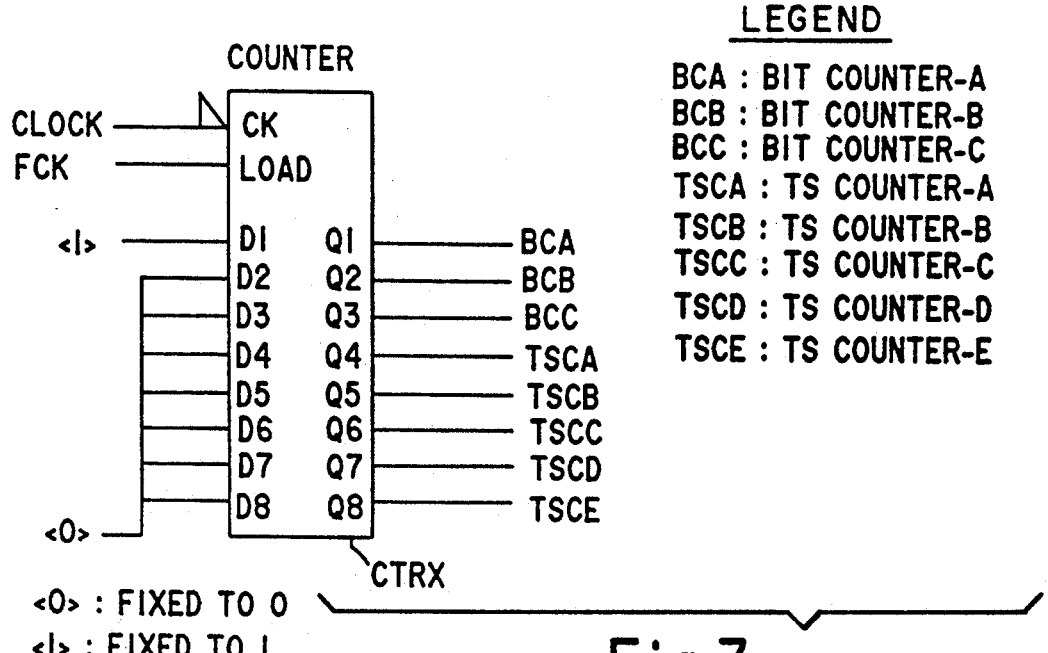
FIG. 3 shows the circuit of the CTRX.
Figure 4:
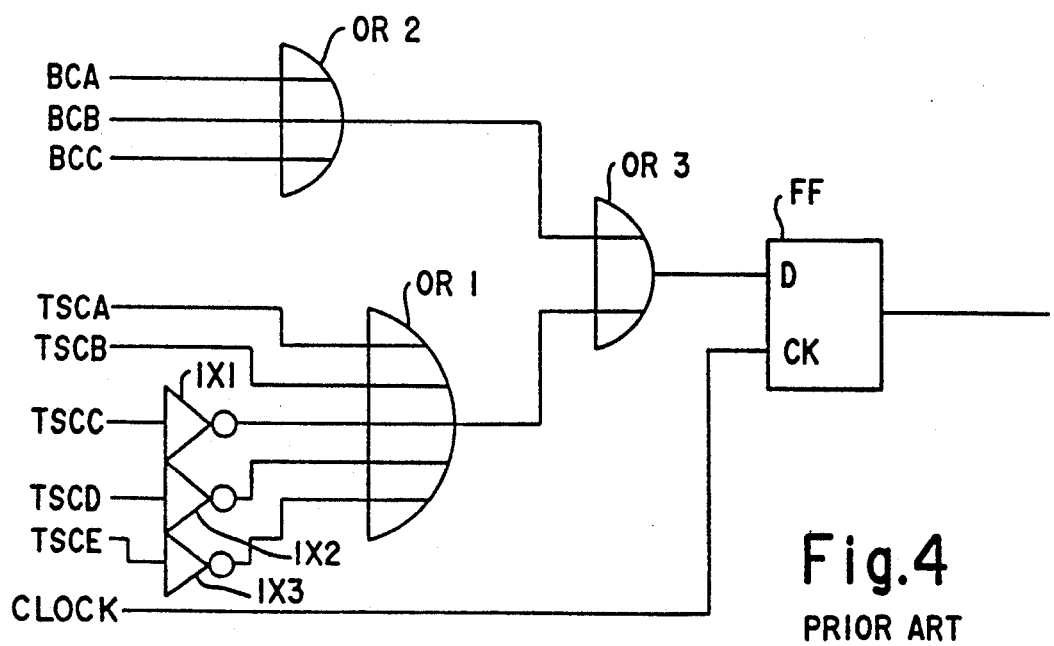
FIG. 4 shows the circuit of the TGX.
Figure 5:
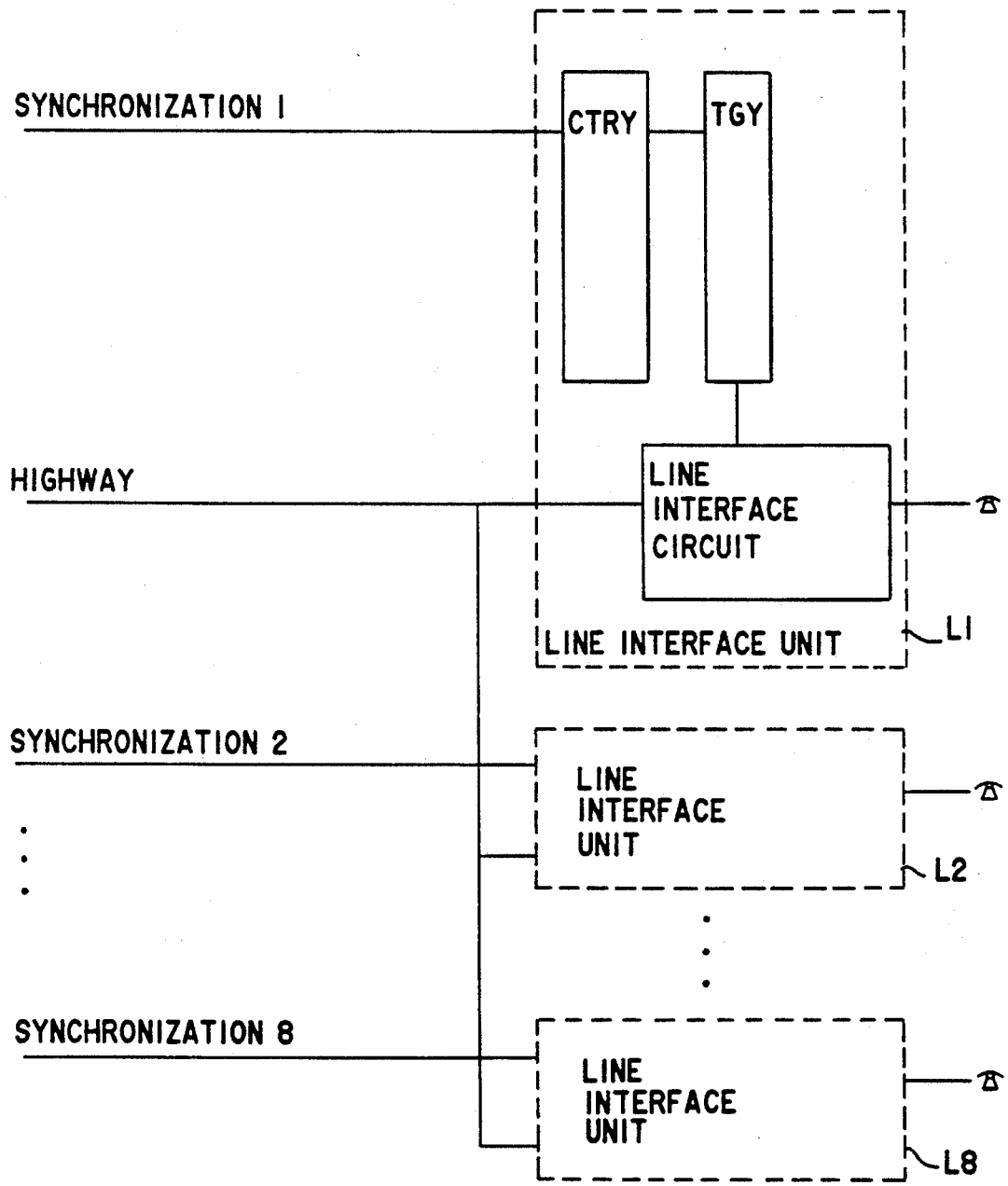
FIG. 5 shows the configuration of the conventional one-line-to-one-circuit in which a synchronous signal is applied separately.
Figure 6:
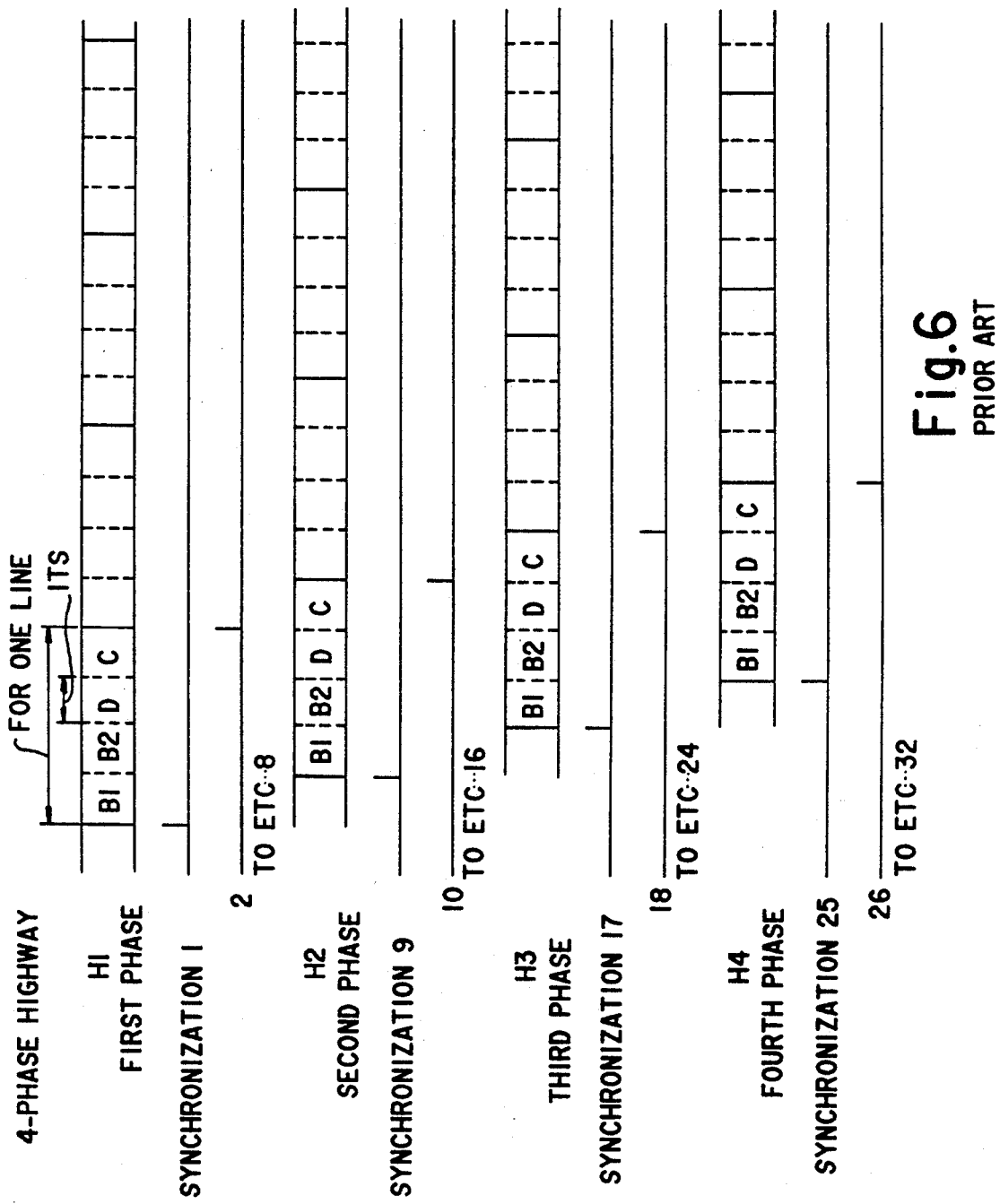
FIG. 6 is a timing chart of the 4-phase highway.
Figure 8:
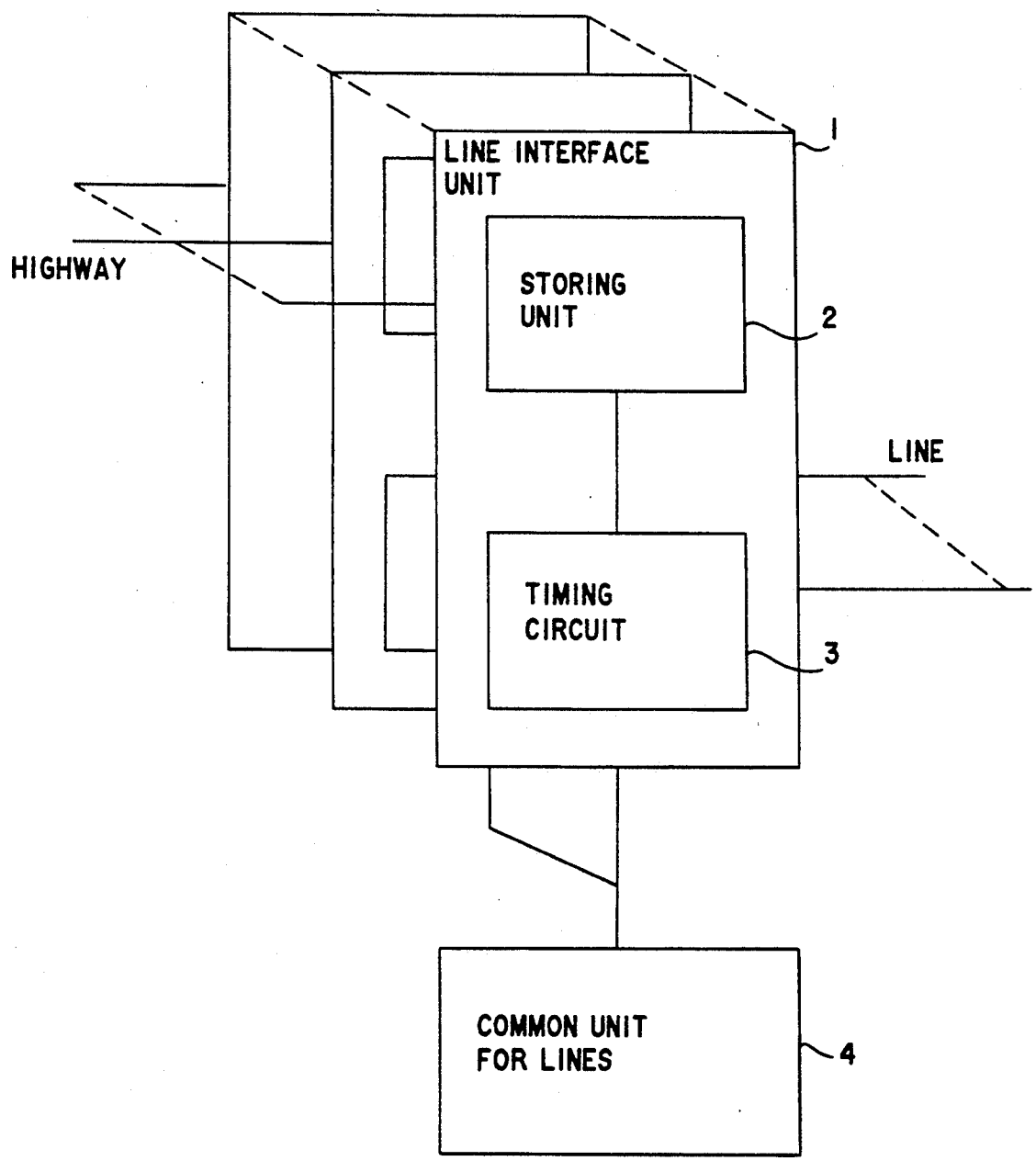
FIG. 8 is a block diagram of the principle of the present invention.

FIG. 8 is the block diagram for explaining the principle of the present invention. The present invention is used in a time divisional electronic switching unit in which a signal for a plurality of lines is transmitted through a time-multiplexed highway.

One or more line interface units 1 are provided in a system. Each of the units comprises a storage unit 2 for storing line-specific time slot information and a timing circuit 3 for generating timing for each line according to the time slot information.

A common unit for lines 4 generates necessary time slot information for the line coordinating units provided for each line connected to a highway.

The storage unit 2 in a line coordinating unit 1 stores the data corresponding to the time position of a line in a highway. The timing circuit 3 generates a strobe signal corresponding to the position data in the storage unit 2. Using the generated strobe signal, the time slot for the time-multiplexing process can be obtained for each line interface unit.

When a time slot for one line consists of a plurality of smaller time slots, time slot information is generated in common for a specified number of line coordinating units 1 according to the timing generated by the common unit for lines 4.

Since the line interface unit 1 stores time slot information corresponding to each line, the timing for. a specific time slot can be obtained only by providing the basic clock, and a plurality of timings per line can be commonly provided by the line coordinating unit 4. Thus, a single-line circuit pack system can be realized.

Figure 9:
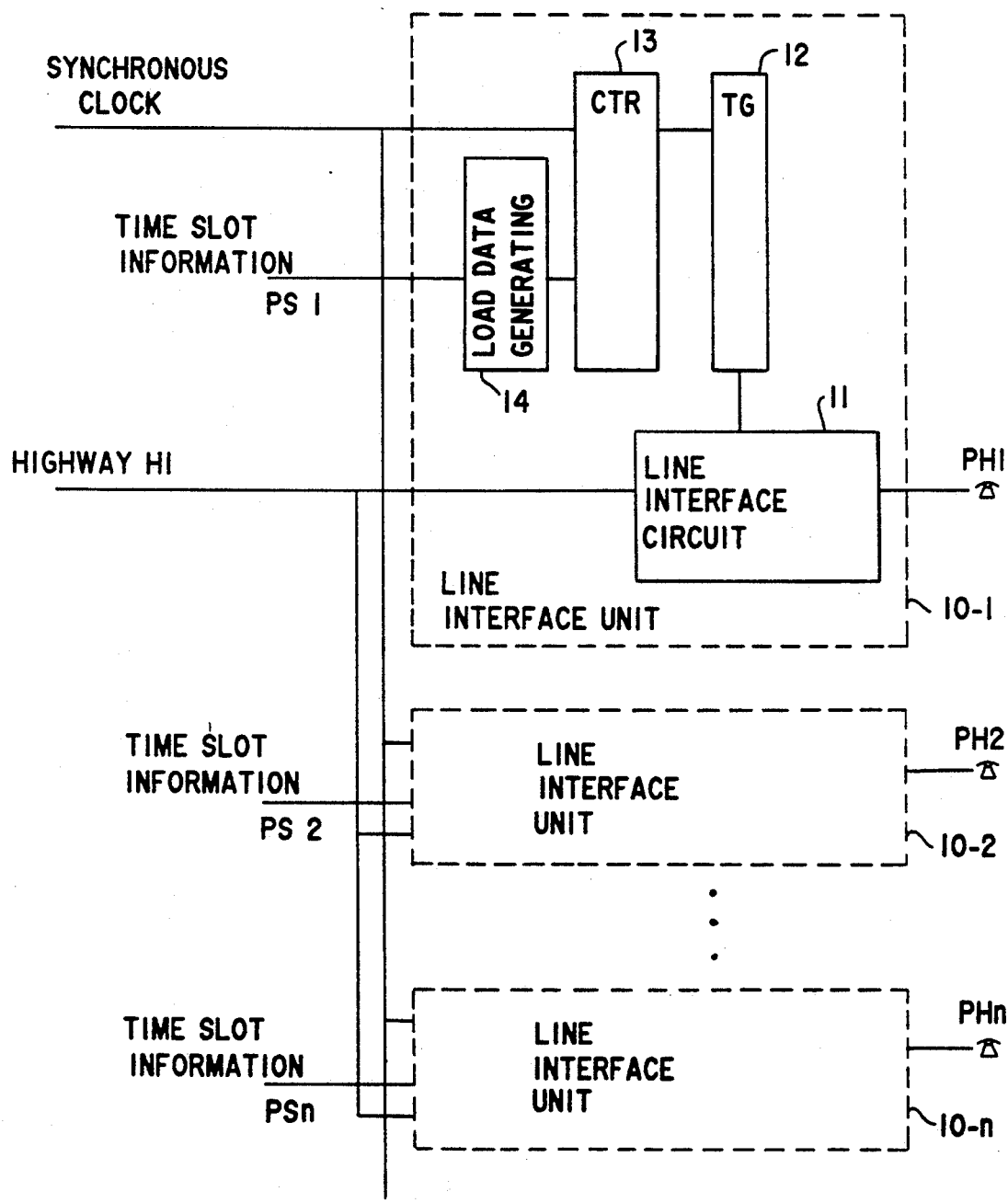
FIG. 9 shows the configuration of the first embodiment of the present invention.

FIG. 9 shows the configuration of the first embodiment of the present invention. Highway H1 comprises n time slots, that is, 8 channels. Each of the line interface units 10-1-10-n are provided with a line interface circuit 11, a load data generating circuit 14, a counter (CTR) 13, and a timing generator (TG) 12. Highway H1 is connected to each of the line interface units 10-1-10-n, and each of them is connected one to one to lines Ph1 through Phn respectively.

Time information PS1-PSn generates a strobe signal used by the line interface circuit 11 to indicate corresponding data for a specific position. The timing generator 12 is provided with a circuit for generating a strobe signal according to a signal from the counter 13. The counter 13 counts from 0 to 31, and is provided with the load data generated at initialization and at frame (8 KHz) timing by the load data generating circuit 14 according to the time slot information PS1-PSn. The counter 13 starts counting according to the value of this data.

This process is explained below in detail. The time slot information used for inserting and reading data in a frame is applied to the load data generating circuit 14. When the time slot information comprises 32 time slots, it occupies 5 bits. The load data generating circuit 14 comprises a latch circuit, receives 5-bit time slot information when it is powered on and reset, and outputs the information to the counter 13. The counter 13 can be preset and loaded with data during the initialization after being powered on or reset or according to a frame timing signal (8 KHz). The counter 13 counts the synchronous clock signal CLOCK. Since the counting operation is continuously performed once it starts counting the clock, the count value is biased by the preset value obtained at initialization. Therefore, counter 13 can have 32 different phases. A timing generator is provided with a decoder and the decoder outputs "1" when a specific decode value, for example "0", is indicated. Then, the output value and the synchronous clock signal CLOCK are ANDed and output as a timing signal, thereby operating each of the line interface circuits at a specific time position.

Figure 10:
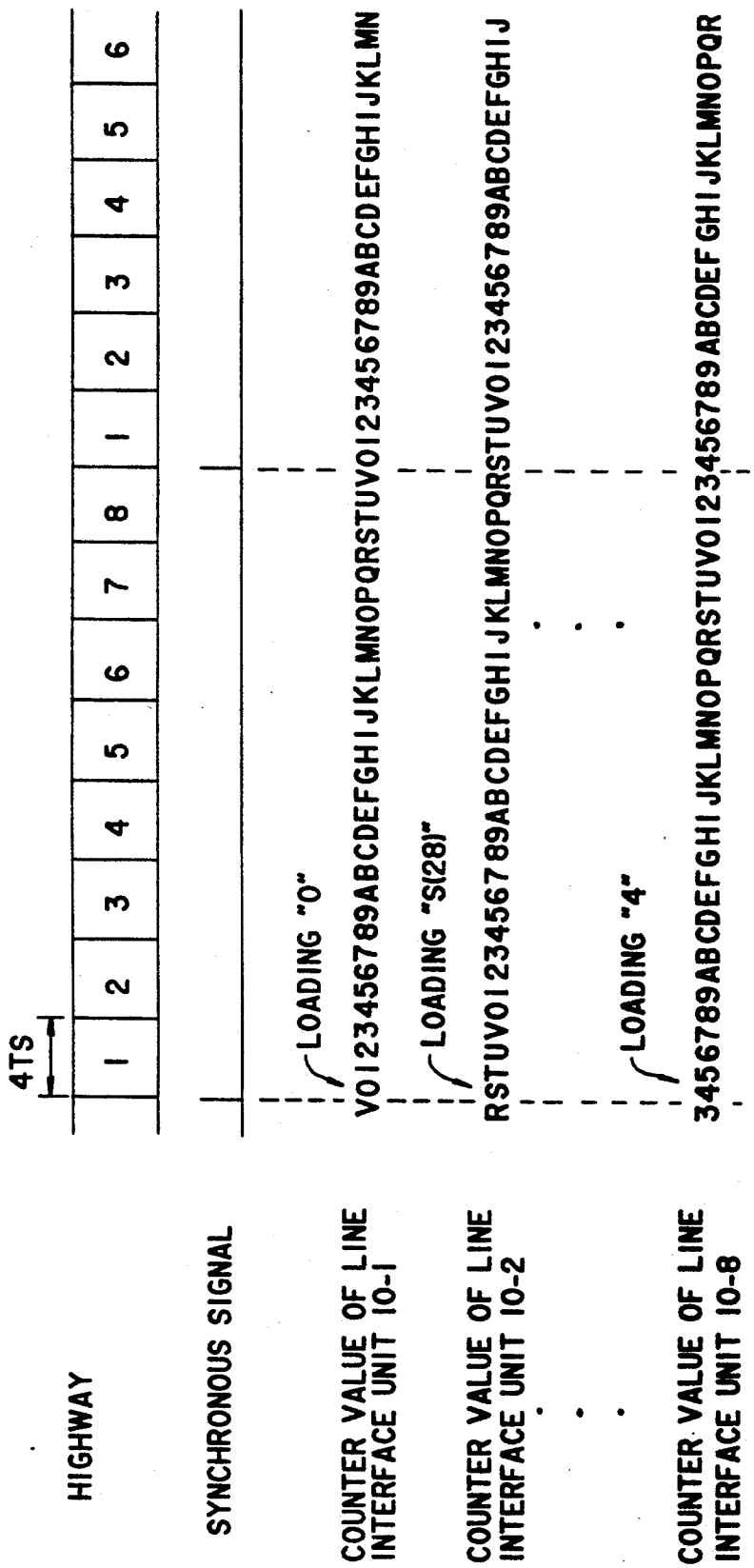
FIG. 10 is a timing chart for loading data.

FIG. 10 is a timing chart for explaining the operation of the load and the counter where 0, 28, or 4 is loaded when a count is started. One channel comprises 4 time slots, having a total of 31 time slots sequentially from O to V (31). For example, when time slot information PS1 indicates 0, time slot information PS2 indicates 28, and time slot information PSn indicates 4, the counter is loaded with 0, 28, and 4 respectively. (FIG. 10 shows the numbers larger than 9 by an alphabetic character to save spaces in the format. For example, S indicates 28.) As this operation is repeated, the line coordinating circuit 11 operates at the position of the initial load. Since initial settings are different when a single circuit is used, timing for a, different position in the same highway can be generated in a single circuit pack. Other operations of the counter 13 and the timing generator 12 are performed in the conventional manner.

Summing up the above described operations, different specific time slot information can be given through the back board to each of the single-line circuit pack accommodated in a single highway. According to the information and a common synchronous signal. The counter in a single-line circuit pack is synchronized with the data for the corresponding line interface unit. In the case of a single-phase highway in a system, 8 types (3 bits) of time slot information are provided. In the case of a 4-phase highway, 32 types (5 bits) of time slot information are provided.

The single-phase highway is assumed in the following description. For example, 1 frame comprises 32 time slots each comprising 8 bits to be transmitted at the rate of 2.048 Mb/s, and 1 frame is operated in a 1/8 KHz cycle. If the highway is operated with 8 lines, 8 types of time slot information are provided, for example, as 0-7. If 32 time slots are divided into 8 parts, 4 time slots are assigned to each piece of the information. Thus, an offset is fixed at every fourth time slot. When a synchronous signal is received, the counter is set to 0 at position 0, to 28 (32−4×1) at position 1, to 24 (32−4×2) at position 2, and in the same manner for the other positions. Thus, each counter synchronously indicates 0 when the data for each line are received and sent. The value loaded into the counter can be obtained by the equation:

$$load\ value = m - k \times line\ number$$

where "m" indicates the number of time slots per frame, and "k" indicates the number of time slots per line.

Figure 11:
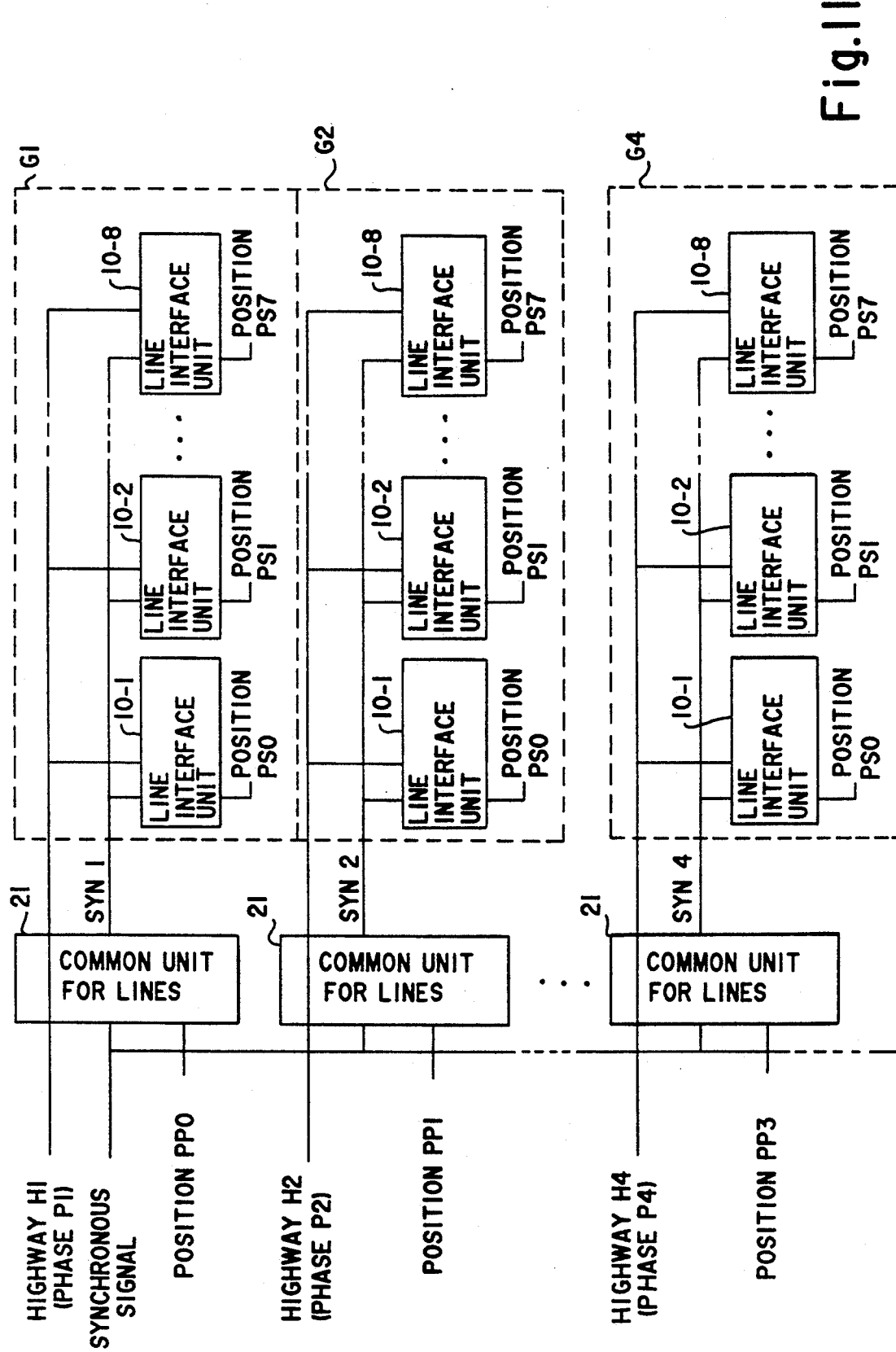
FIG. 11 shows the configuration of the second embodiment of the present invention.

In the first embodiment of the present invention shown in FIG. 9, 32 types (5 bits) of time slot information must be provided for the line interface unit when a 4-phase highway is used. In this case, since a channel in each phase is located at the same relative position from the synchronous signal, the same circuit configuration can be given to each phase by applying a different synchronous signal to each phase. This is shown in FIG. 11 as the second embodiment. For example, a common unit for lines 21 is provided for a plurality of lines when a system has a 4-phase highway. If 32 types of information are required, a synchronous signal (SYN1-SYN4) is generated by the common unit for lines 21 at the offset of 1 time slot based upon the 2-bit time slot information PP0-PP3, and is output to the following line interface units (i.e. the time slot information PP0-pp3 is written into the common unit for lines 21 and then respective units 21 generate reference synchronous signals SYN 1-SYN 4 for use in each group G1-G4 based upon the time slot information PP0-PP3). The internal counter CTR (see FIG. 9) generates SYN 1-SYN 4 based on the data set in the common unit for lines 21. Then, the line interface unit generates a timing at a 4-time-slot offset according to the synchronous signal and 3-bit time slot information.

FIG. 11 shows the configuration of the second embodiment of the present invention. Highway H1 at phase P1 is connected to the first group G1. The first group G1 comprises the line coordinating units 10-1-10-8, and the time slot information PS0-PS7 is applied to each of them respectively. The time slot information is the information to be set in the common unit for lines to which a different highway is connectedly input and therefore the phase can be shifted by setting values different from each other as discussed above. The same operation is performed on highways H2-H4. The groups G1-G4 comprise the line interface units in the configuration shown in FIG. 9.

Figure 12:
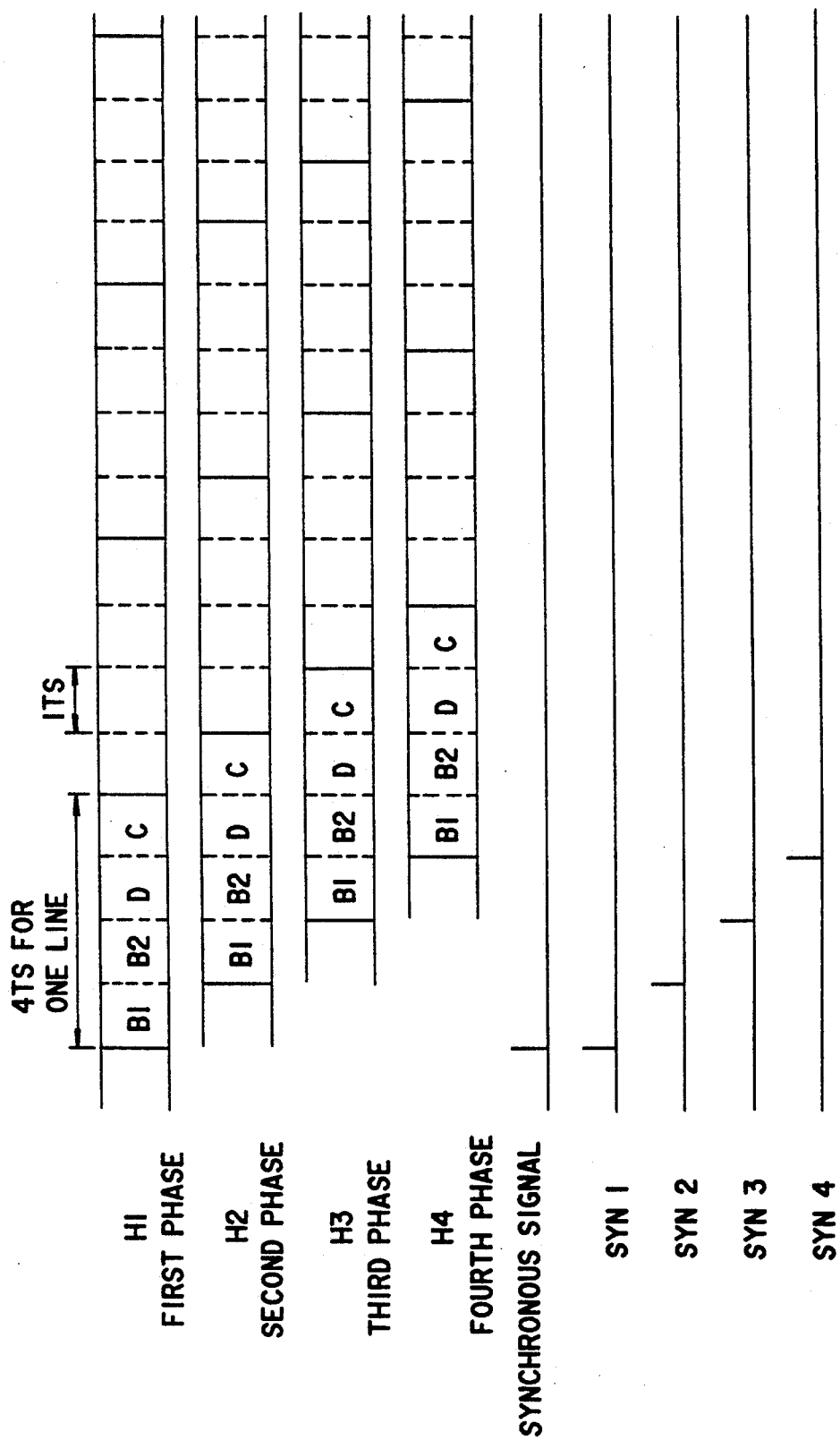
FIG. 12 is a timing chart of the second embodiment.

In the groups G1-G4, the phase of each of the synchronous signal SYN1-SYN4 generated by the common unit for lines 21 is shifted by 1 time slot as shown in FIG. 12. For example, when synchronous signals SYN 1-SYN 4 shown in FIG. 12 are each shifted by one time slot when generated, any of the numbers 0, 3, 2 and 1 is written into each time slot information as discussed above with respect to FIGS. 9 and 10. The shift is generated in accordance with the time slot information PP0-PP3. Thus, four synchronous signals are generated in the common unit for lines 21 based upon only one synchronous signal and the four synchronous signals are shifted by a counter in each line interface unit. Thus, a total of 32 kinds of synchronous signals are generated. Accordingly, the number of connection lines can be reduced. This enables a 128-channel line (i.e. four highways of 32 signals each) to be switched and connected through a minimum possible number of synchronous signal lines. In the above described method, timing is generated at every fourth time slot. However, another timing can be similarly realized.

Figure 13:
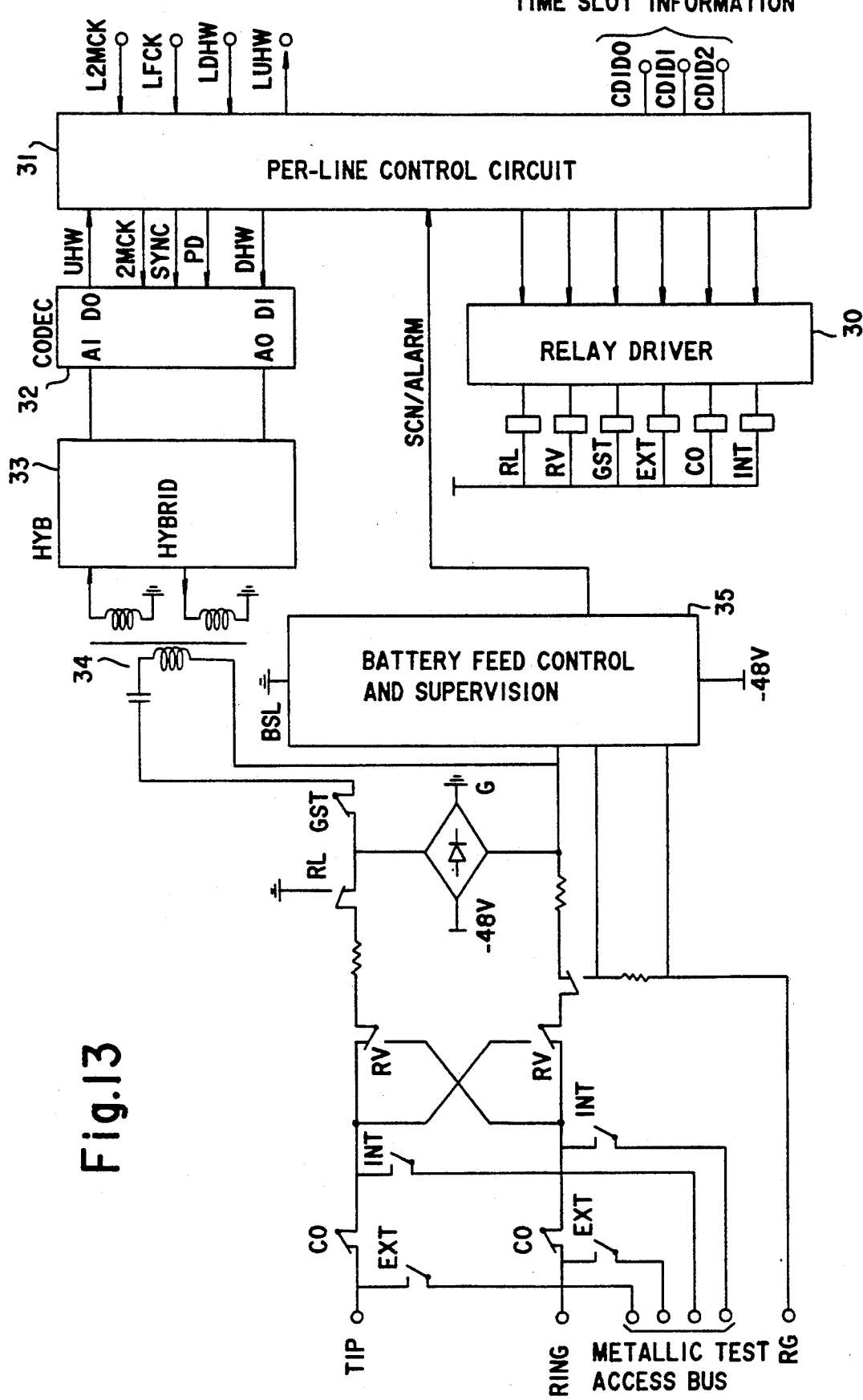
FIG. 13 shows the configuration of the line coordinating unit.
Figure 14:
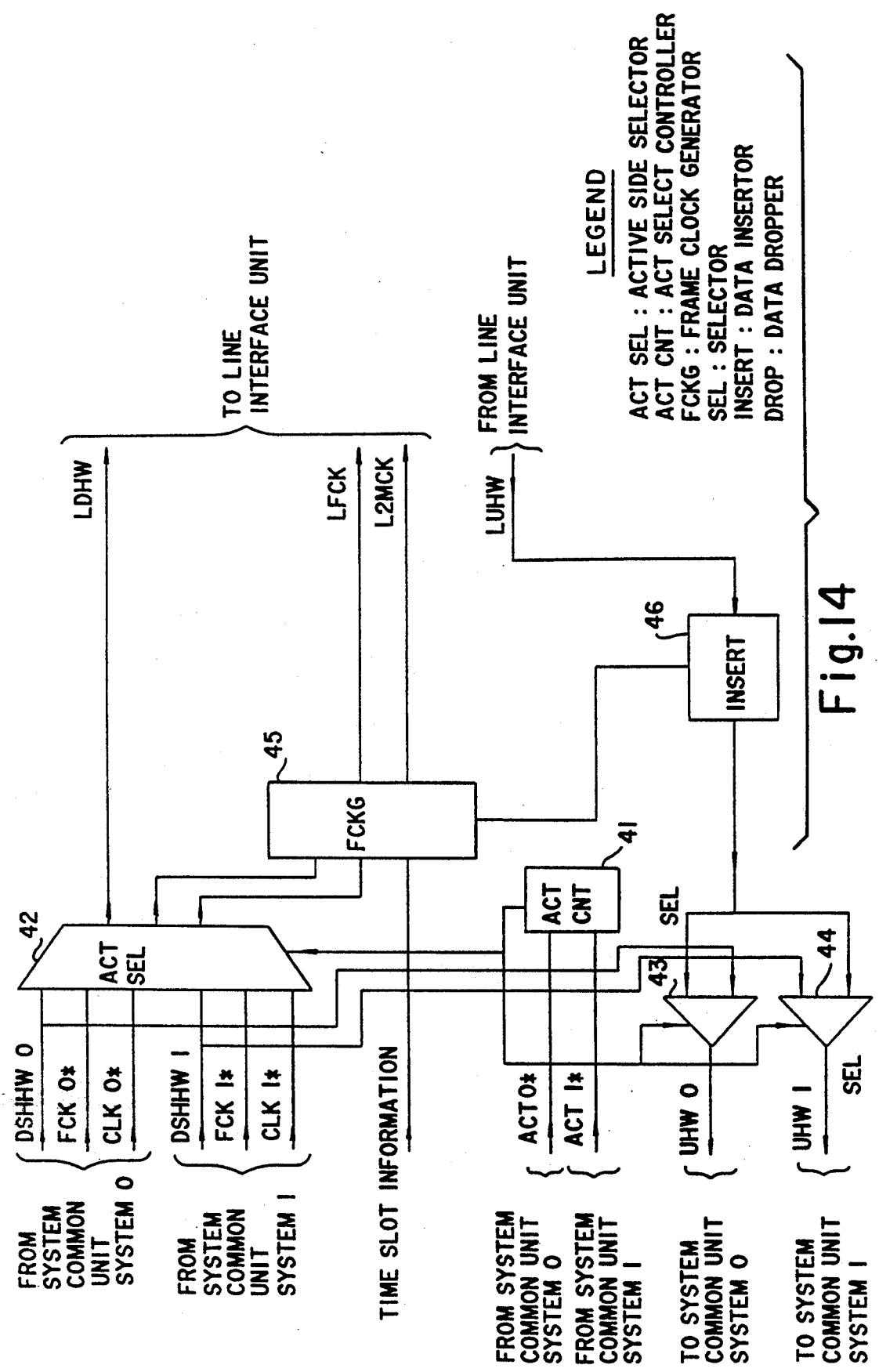
FIG. 14 shows the configuration of the common unit for lines.

FIGS. 13 and 14 show the detailed configuration of the line interface unit and the common unit for lines respectively. A signal L2MCK, a signal LFCK, and a signal LDHW are applied to a per-line control circuit 31. The signal LDHW is a highway signal, and the per-line control circuit outputs the input data of the signal LDHW to a CODEC 32. The signal LFCK is generated by the common units for lines 21 described later and shared among lines. The per-line control circuit 31 generates a synchronous signal SYNC required by the CODEC 32 according to the signal LFCK and the time slot information CDID0-CDID2 (PS0–PS7 shown in FIG. 11), and outputs it to a CODEC 32. The CODEC 32 obtains the information addressed to its line according to the time slot information of the synchronous signal, converts it into a voice signal, and outputs an analog signal from terminal AO. The analog signal is output to terminals Tip and Ring through a hybrid circuit 33, a hybrid transformer 34, and the connection point controlled by the relay of each line interface unit. In return, a voice signal input from terminals Tip and Ring is applied to. input terminal AI of the CODEC 32 in the reverse route. The CODEC 32 converts the signal input by input terminal AI to a digital signal (through a conversion A-Law, µ-Law, etc.), and outputs it to the per-line control circuit 31 via signal UHW. The signal is output at the timing which is indicated by the synchronous signal SYNC. The input signal UHW is inserted to the highway as the signal LUHW.

A battery feed control and supervision (BSL) 35 controls the output of 48V to lines, detects on-hook and off-hook of a telephone unit connected to its own line, detects a short circuit (earthing) of the −48V side to the ground, and outputs it as an SCN/ARLARM signal to a per-line control circuit 31.

In addition to the control of the above described CODEC 32, the per-line control circuit performs a power-down control on the CODEC 32 according to the SCN/ARLARM signal, and controls the relay unit.

A relay driver 30 drives each of the relays RL, RV, GST, EXT, CO, and INT according to the instruction from the per-line controller 31. Since the operation and the connection point of each relay are similar to those of the conventional method, the explanation is omitted here.

The digital data of the received voice and the control information for controlling the relay, etc. are provided through the above described signal LDHW in the assigned slots. The control information about the relay is obtained from the control information in the slot and outputted to the above described relay driver 30.

The line interface unit 10-n inputs the time slot information ps-n (3-bit information CDID0, CDID1, and CDID2 from the per-line control circuit 31) to obtain a total of 8 phases. Additionally, a 4-phase signal LFCK and a total of 32-phase highway information is generated as shown in FIG. 14. The signal LFCK is generated and the system is duplicated by the common unit for lines. The higher order portion of the switching unit is duplicated and comprises a system 0 and a system 1 of system common units. The duplicated system common unit sets the ACT 0* and the ACT 1* to "0" when the duplicated system common unit becomes an active system. That is, when the system 0 becomes active, the ACT 0* is set to "0", and when the system 1 becomes active, the ACT 1 is set to "0". When the ACT 0* and ACT 1* are set to "0,1", an ACT selecting controller (ACT CNT) 41 determines the ACT 0* to be active, and determines the ACT 1* to be active when they are set to "1,0". It instructs the selection of the signals LUHW, LDHW, LFCK, and L2MCK to be issued to the system common unit.

When the ACT 0* and the ACT 1* indicate "0,0" or "1,1", the ACT CNT 41 maintains the present state.

When "0,1" is applied to the ACT CNT 41, the system 0 becomes active, and the ACT CNT 41 instructs an ACT side selector (ACT SEL) 42, and selectors 43 and 44 to select the system 0. According to this instruction, the ACT SEL 42 selects input signals DSHW 0, FCK 0*, and CLK 0*, and outputs the signal LDHW to the line interface unit, and the signals FCK 0* and CLK* to a frame clock generator (FCKG) 45.

In addition to the above described signals FCK 0* and CLK *, 2-bit time slot information (having a value P1-P4) is applied to an FCKG 45. According to this time slot information, a signal LFCK is generated at the time slot specified by this time slot information, and it is, together with a signal CLK 0*, output to the line coordinating unit 10-n as a signal L2MCK.

When "1,0" is applied to the ACT CNT 41, it selects signals DSHHW 1, FCK 1*, and CLK 1 unlike the above described case.

On the other hand, a signal LUHW applied by the line interface unit 10-n is connected to the first terminal of the selector 43 and the second terminal of the selector 44 through a data inserter (INSERT) 46. A signal DSHHW 0 input from the system 0 of the system common unit is applied to the second terminal of the selector 43, and a signal DSHHW 1 input from the system 1 of the system common unit is applied to the first terminal of the selector 44. The signals DSHHW 0 or DSHHWL become a signal LDHW when they are selected by the ACT SEL 42.

When system 0 becomes active, the selector 43 selects the output from the data inserter 46, and outputs it to system 0 of the system common unit as a signal UHW 0. Then, the selector 44 selects the signal DSHHWL and outputs it as a signal UHW 1. When system 1 becomes active, the reverse selection is made, and the selector 43 selects the signal DSHHW 0 and outputs it to system 0 of the system common unit as a signal UHW 0. Meanwhile, the selector 44 selects the output from the data inserter 46 and outputs it to the system 1 as a signal UHW 1.

The data inserter 46 inserts in the signal LUHW the information including the clock generated by the FCKG 45 and the state of the counter in the FCKG 45, for example, the state of the alarm of the counter stack, etc. Voice and control signals have already been inserted in the signal LUHW by the line interface unit 10-n, and the above described additional information is inserted by the data inserter. Then, the information-loaded LUHW signal is applied to an active system common unit.

When a 32-time-slots, that is, a 32-phase, highway signal is generated according to the above described operation, 3 bits for each line coordinating unit and 2 bits commonly used for i.e, shared by a plurality of parts are determined separately. Thus, each circuit pack can comprise with the minimum possible number of signal lines, and can also be shared efficiently within a system. Since the shared portion of the circuit pack can be furthermore shared in the system, two types of circuit pack can form a circuit except a system common unit, thereby improving the reliability and providing a low-cost system.

The present invention can realize the configuration comprising one synchronous signal although the system actually involves 128 lines. However, these 128 lines are connected in a bus structure. Such a signal line shared among a number of line coordinating units often causes errors (an input from each line interface unit can generates an error), and may yield a high fault rate and cause wide ranging errors. Therefore, a single signal is transmitted through separate signal lines and output gates as shown in the second embodiment so as to improve the reliability. For example, a signal is transmitted through 16 lines each carrying a signal for 8 lines to improve the reliability.

By contrast, a small circuit pack is used in a single-line circuit pack method. The small circuit pack requires an uncommon implementation to improve the efficiency (for example, a drawer configuration). When a system common unit is placed in the portion separate from the line interface units, a cable for connecting the system common unit to the line interface units is required. In this case the number of the cables increases if the reliability is considered. Therefore, a common signal to all line interface units is connected from the system common unit to a line interface unit through one line. At the buffer unit, the signal is received by one input gate and then distributed to line coordinating units through a plurality of gates. Thus, even with the minimum possible number of cables guarantee a high reliability.

Figure 15:
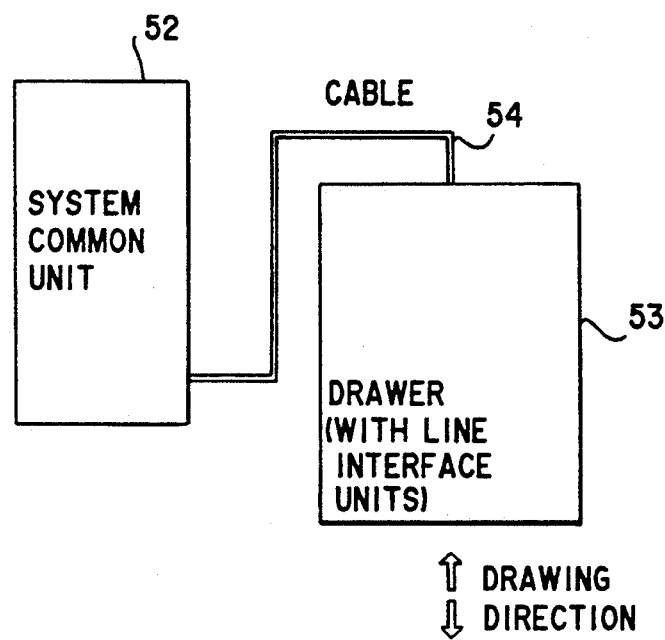
FIG. 15 shows the relationship between the implementation and the distribution.
Figure 16:
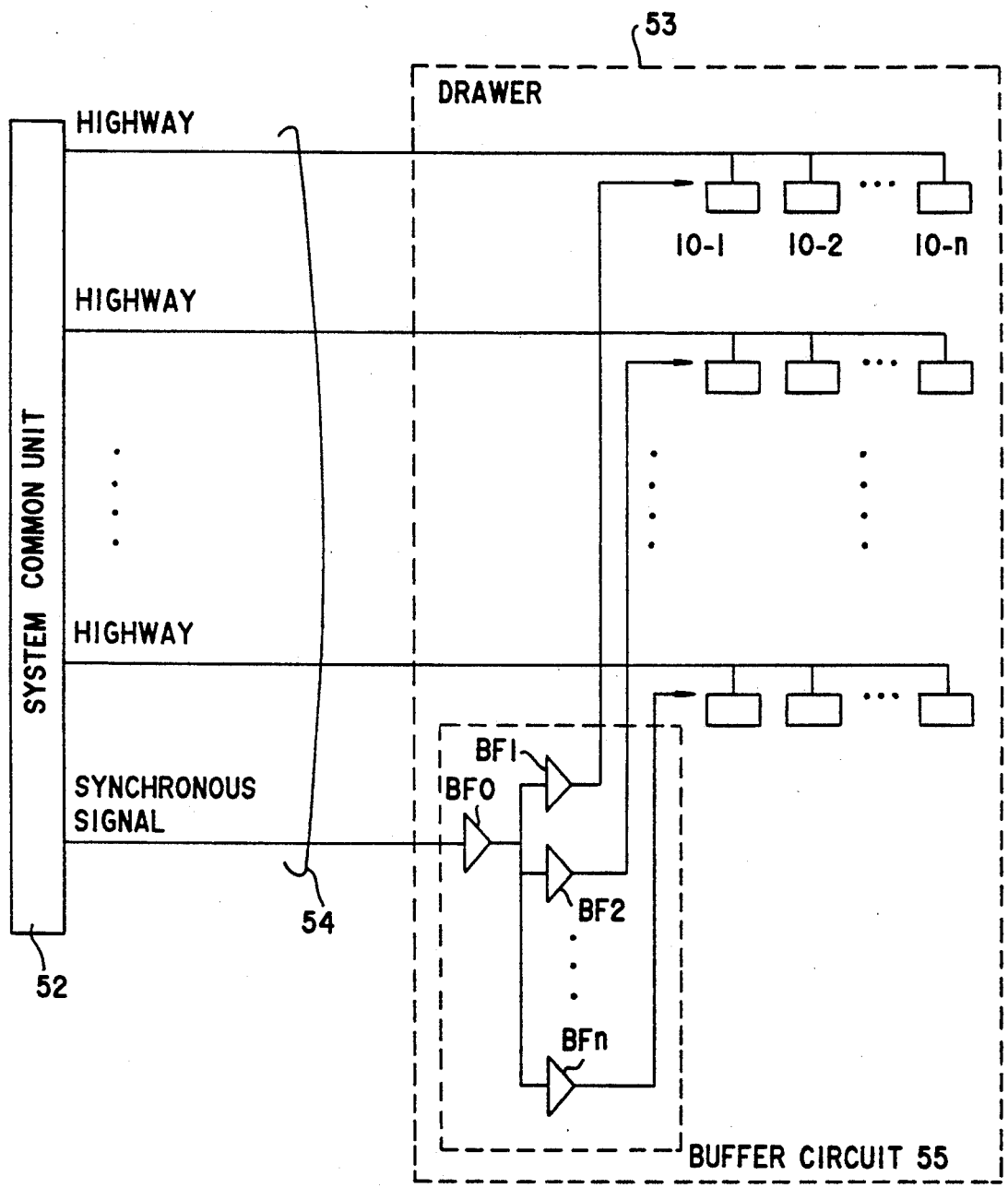
FIG. 16 shoves the configuration of the distribution.

FIG. 15 shows the relationship between the system common unit and the drawer. FIG. 16 shows the configuration of the drawer. A system common unit 52 and the drawer 53 having a plurality of line interface units are connected through a cable 54. With a highway and a synchronous signal line, the whole highway may become defective when one line interface unit fails. When the input circuit of a clock fails, it should affect only the line interface unit in the related highway. For this purpose, a synchronous signal is distributed to each 8-channel highway. A buffer circuit 55 first receives a synchronous signal using a buffer BF0, divides it into buffer circuits BF1-BFn, and outputs them corresponding to each highway. In this case, one circuit fault causes at a maximum only the fault in the related highway, thereby reducing the spreading of faults.

Figure 17:
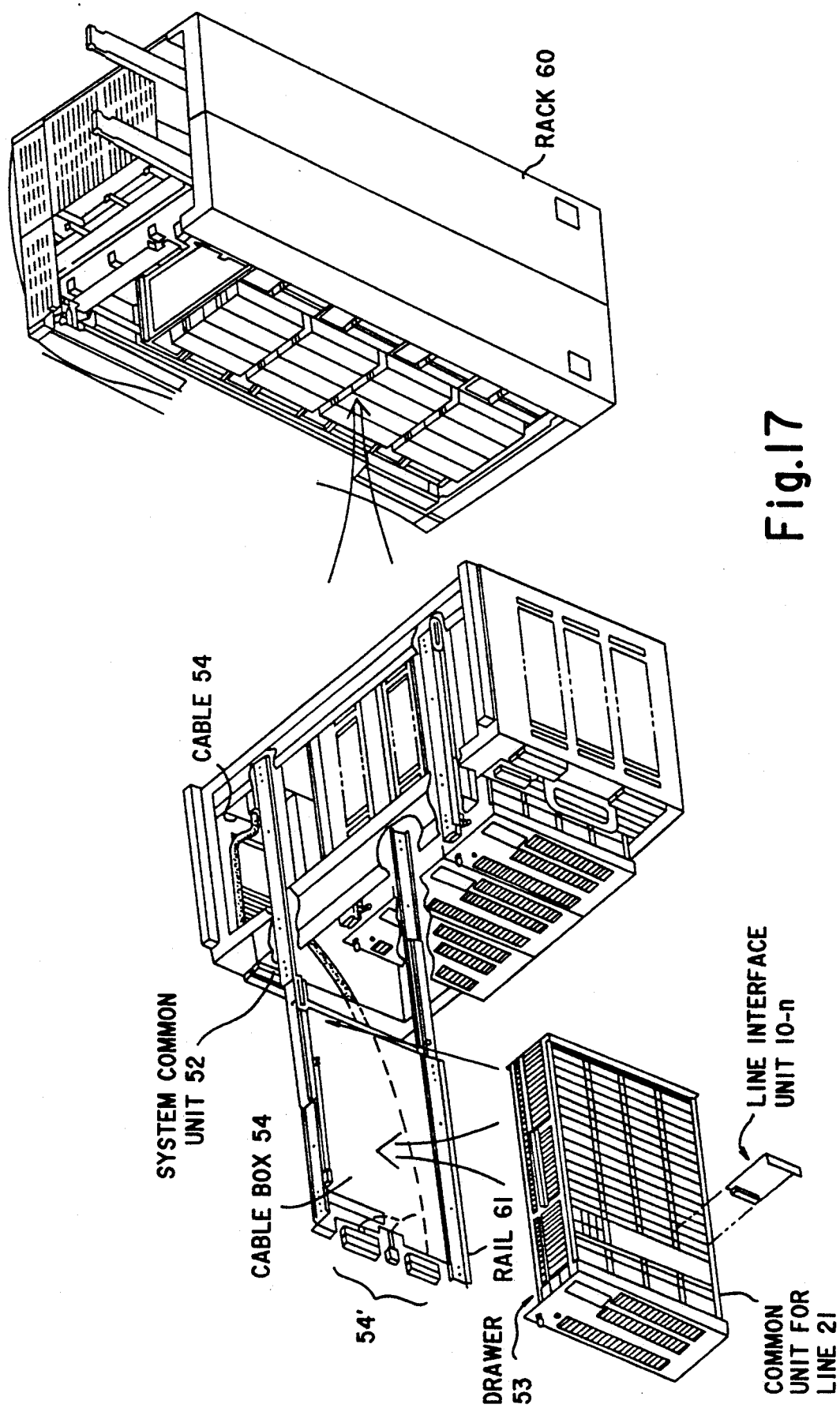
FIG. 17 shows the configuration of the rack.

FIG. 17 shows the configuration of the rack in the second embodiment of the present invention. In FIG. 17, one block comprises 4 sets each comprising one common unit for lines 21 and 8 line interface units 10-n. Four blocks form one system, and a system common unit 52 is provided for each system. This group refers to one shelf, and four groups are mounted in one rack 60. The line common unit 21 in one block is connected to the system common unit 52 through the cable 54 having a connector. The block connected to the cable 54 is set to a sliding rail and inserted in the system.

What is claimed is:

1. A time-multiplexed highway line selection system used in a time divisional electronic switching unit, said system comprising:
   line interface means provided corresponding to each subscriber line, said line interface means receiving a clock signal, said line interface means including storing means for storing time slot information specific to each subscriber line, and
   timing generating circuit means, connected to said storing means, for generating from said time slot information a timing for a specific time slot for said subscriber line.

2. The time-multiplexed highway line selection system according to claim 1, wherein
   said timing generating circuit means comprises a counter for counting said clock signal for subscriber lines accommodated in a time-multiplexed highway, and said counter starts counting said clock signal after loading said time slot information stored in said storing means.

3. The time-multiplexed highway line selection system according to claim 1, wherein
   output of said line interface means is controlled according to control information stored within a respective time slot provided in said time-multiplexed highway.

4. The time-multiplexed highway line selection system according to claim 1, wherein
   said timing of said timing generating circuit is generated according to a strobe signal corresponding to a position stored by said storing means.

5. The time-multiplexed highway line selection system according to claim 4, wherein
   said line interface means reads and writes data stored within a respective time slot according to said strobe signal.

6. The time-multiplexed highway line selection system according to claim 1, wherein
   a plurality of said line interface means are configured as a one-line-to-one-printed board.

7. A time-multiplexed highway line selection system used in a time divisional electronic switching unit in which a data signal, for a plurality of subscriber lines, is transmitted through a time-multiplexed highway, wherein
   common means for subscriber lines is connected according to time slot information specific to each time-multiplexed highway lines, and said common means applies a common timing signal required for a line interface means provided for each subscriber line, and
   said line interface means comprises:
   storing means for storing time slot information specific to each subscriber line processed in a time divisional manner, and
   timing generating circuit means, connected to said storing means, for generating timing for a specific time slot for a corresponding subscriber line using said time slot information.

8. The time-multiplexed highway line selection system according to claim 7, further comprising
   a system controlling unit which is connected to a plurality of said common means through a one-input-to-multiple-output (1 to n) buffer circuit.

9. The time-multiplexed highway line selection system according to claim 7, wherein
   at least two time divisional electronic switching units are provided, and said common means selects an active time divisional electronic switching unit.

10. The time-multiplexed highway line selection system according to claim 7, wherein
    said common timing signal from said common means specifies slot information stored in a plurality of said line interface means.

11. The time-multiplexed highway line selection system according to claim 7, wherein
    n line interface means provided for every m common means for lines to form one block, and
    L blocks connected as one system to a system common unit, n, m and L are predetermined integers.

12. The time-multiplexed highway line selection system according to claim 11 wherein
    P units of said systems form a set to be put in a rack, P is a predetermined integer.

* * * * *